United States Patent
Falagario et al.

(10) Patent No.: US 10,752,094 B2
(45) Date of Patent: Aug. 25, 2020

(54) SELECTIVE FILTRATION LEVEL AIR TREATMENT SYSTEM

(71) Applicant: CNH Industrial America LLC, New Holland, PA (US)

(72) Inventors: Angela Falagario, Modena (IT); Gianluca Fava, Modena (IT); Adriano Vaccari, Soliera (IT)

(73) Assignee: CNH Industrial America LLC, New Holland, PA (US)

( * ) Notice: Subject to any disclaimer, the term of this patent is extended or adjusted under 35 U.S.C. 154(b) by 396 days.

(21) Appl. No.: 15/324,613

(22) PCT Filed: Jul. 7, 2015

(86) PCT No.: PCT/EP2015/065512
§ 371 (c)(1),
(2) Date: Jan. 6, 2017

(87) PCT Pub. No.: WO2016/005401
PCT Pub. Date: Jan. 14, 2016

(65) Prior Publication Data
US 2018/0178633 A1 Jun. 28, 2018

(30) Foreign Application Priority Data

Jul. 9, 2014 (IT) .............................. MO2014A0196

(51) Int. Cl.
*B60H 3/06* (2006.01)
*B62D 33/06* (2006.01)
*B60H 1/00* (2006.01)

(52) U.S. Cl.
CPC ....... *B60H 3/0633* (2013.01); *B60H 1/00378* (2013.01); *B60H 3/0625* (2013.01); *B62D 33/0612* (2013.01)

(58) Field of Classification Search
CPC ......... F24F 11/76; B60H 3/06; B60H 3/0633; B60H 1/00378

(Continued)

(56) References Cited

U.S. PATENT DOCUMENTS 2,146,845 A * 2/1939 Payne ................ B60H 1/00042
126/110 B
2,185,486 A * 1/1940 Wahlberg ........... B60H 1/00042
165/43

(Continued)

FOREIGN PATENT DOCUMENTS

| | | |
|---|---|---|
| CA | 1016747 | 9/1977 |
| DE | 19606412 | 8/1997 |

(Continued)

OTHER PUBLICATIONS

Hilpert, et al, DE 19606412 A1 English machine translation, Aug. 28, 1997 (Year: 1997).*

(Continued)

*Primary Examiner* — Edelmira Bosques
*Assistant Examiner* — Phillip Decker
(74) *Attorney, Agent, or Firm* — Rickard K. DeMille; Rebecca L. Henkel

(57) ABSTRACT

A selective filtration system for an operator cab attached to an agricultural vehicle. A HVAC unit supplies conditioned air to an operator space selectively from a CAT 4 filter and a CAT 2 filter. A pressurization blower and two way valve controls flow from the CAT 4 filter to the HVAC unit. Control of flow or isolation of the CAT 2 filter is provided by pressure variations within the system. The CAT 4 filter and CAT 2 filter are isolated from the ambient when they are not in use.

16 Claims, 4 Drawing Sheets

(58) Field of Classification Search
USPC .................................................. 454/229, 156
See application file for complete search history.

(56) References Cited

U.S. PATENT DOCUMENTS

| | | | | |
|---|---|---|---|---|
| 2,213,016 A * | 8/1940 | Perkins | ............ | B60H 1/00042 |
| | | | | 165/43 |
| 2,221,891 A * | 11/1940 | Young | ............... | B60H 1/00071 |
| | | | | 454/139 |
| 2,237,477 A * | 4/1941 | Colvin | ............... | B60H 1/00042 |
| | | | | 165/126 |
| 2,342,872 A * | 2/1944 | Le Fevre | ........... | B60H 1/00071 |
| | | | | 180/68.2 |
| 2,685,244 A * | 8/1954 | Wahlberg | ........... | B60H 1/00042 |
| | | | | 454/147 |
| 2,873,953 A * | 2/1959 | Thorne | ............... | B60H 1/0005 |
| | | | | 165/43 |
| 3,288,048 A * | 11/1966 | Laing | ............... | B60H 1/00007 |
| | | | | 454/160 |
| 3,386,280 A * | 6/1968 | Yamada | .................. | B60H 3/06 |
| | | | | 116/266 |
| 3,626,713 A * | 12/1971 | Venable | ............ | B60H 1/00378 |
| | | | | 62/187 |
| 4,259,896 A * | 4/1981 | Hayashi | ................ | B60H 1/246 |
| | | | | 297/180.14 |
| 4,261,930 A * | 4/1981 | Walker | ..................... | F24F 6/06 |
| | | | | 261/28 |
| 4,344,356 A * | 8/1982 | Casterton | .......... | B62D 33/0617 |
| | | | | 454/139 |
| 4,928,499 A * | 5/1990 | Kiminami | ......... | B60H 1/00735 |
| | | | | 165/43 |
| 5,492,505 A * | 2/1996 | Bell | ....................... | B60H 1/249 |
| | | | | 137/855 |
| 5,938,523 A | 8/1999 | Noureddine et al. | | |
| 6,131,652 A * | 10/2000 | Ito | ..................... | B60H 1/00064 |
| | | | | 165/203 |
| 6,352,208 B1 * | 3/2002 | Shibata | ................ | B60H 1/0005 |
| | | | | 165/202 |
| 6,932,691 B1 * | 8/2005 | Lin | .................... | B60H 1/00692 |
| | | | | 251/901 |
| 7,338,357 B2 * | 3/2008 | Voit, II | ............. | B60H 1/00378 |
| | | | | 296/190.09 |
| 7,954,540 B2 * | 6/2011 | Hoehn | ................ | B60H 1/0005 |
| | | | | 165/103 |
| 8,439,732 B2 * | 5/2013 | Belanger | ............. | B60H 1/249 |
| | | | | 454/156 |
| 8,944,199 B2 * | 2/2015 | Fukunaga | ............. | B60K 11/06 |
| | | | | 180/68.5 |
| 9,409,460 B2 * | 8/2016 | Viglione | .................. | B60H 3/06 |
| 10,300,761 B2 * | 5/2019 | Falagario | ........... | B60H 1/00378 |
| 2012/0125907 A1 * | 5/2012 | Chernyavsky | ..... | B60H 1/00378 |
| | | | | 219/202 |
| 2012/0273160 A1 * | 11/2012 | Hipp-Kalthoff | ... | B60H 1/00378 |
| | | | | 165/42 |
| 2013/0203333 A1 * | 8/2013 | Amura | ............... | B60H 1/00378 |
| | | | | 454/137 |
| 2017/0182863 A1 * | 6/2017 | Davter | ............... | B60H 1/00378 |
| 2018/0043746 A1 * | 2/2018 | Davter | ............... | B60H 1/00378 |

FOREIGN PATENT DOCUMENTS

| | | | | |
|---|---|---|---|---|
| EP | 1503845 | 6/2006 | | |
| WO | WO-2015159248 A1 * | 10/2015 | ......... | B60H 1/00378 |

OTHER PUBLICATIONS

Search Report and Opinion for PCT Application No. PCT/EP2015/065512 dated Oct. 5, 2015.

* cited by examiner

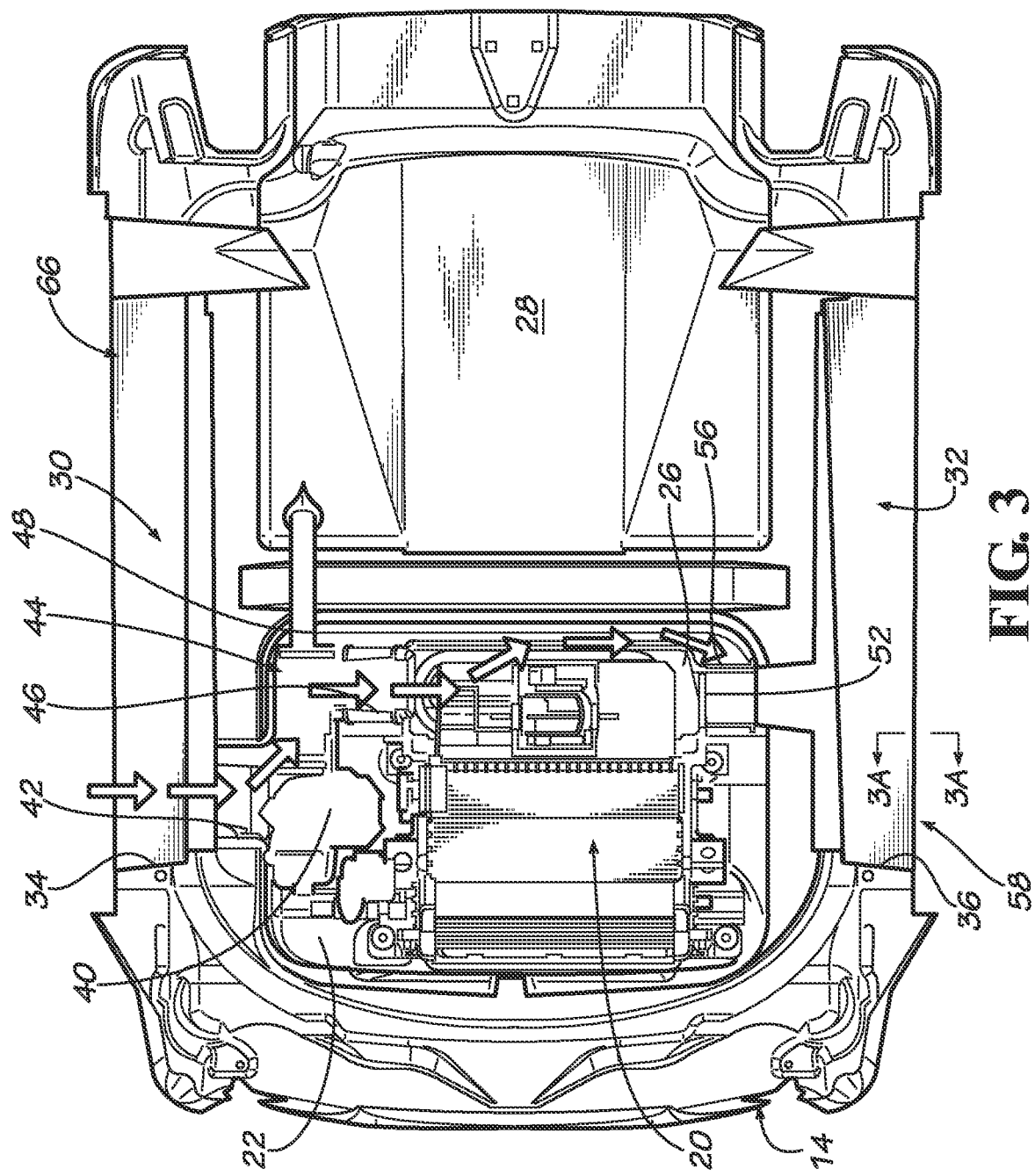

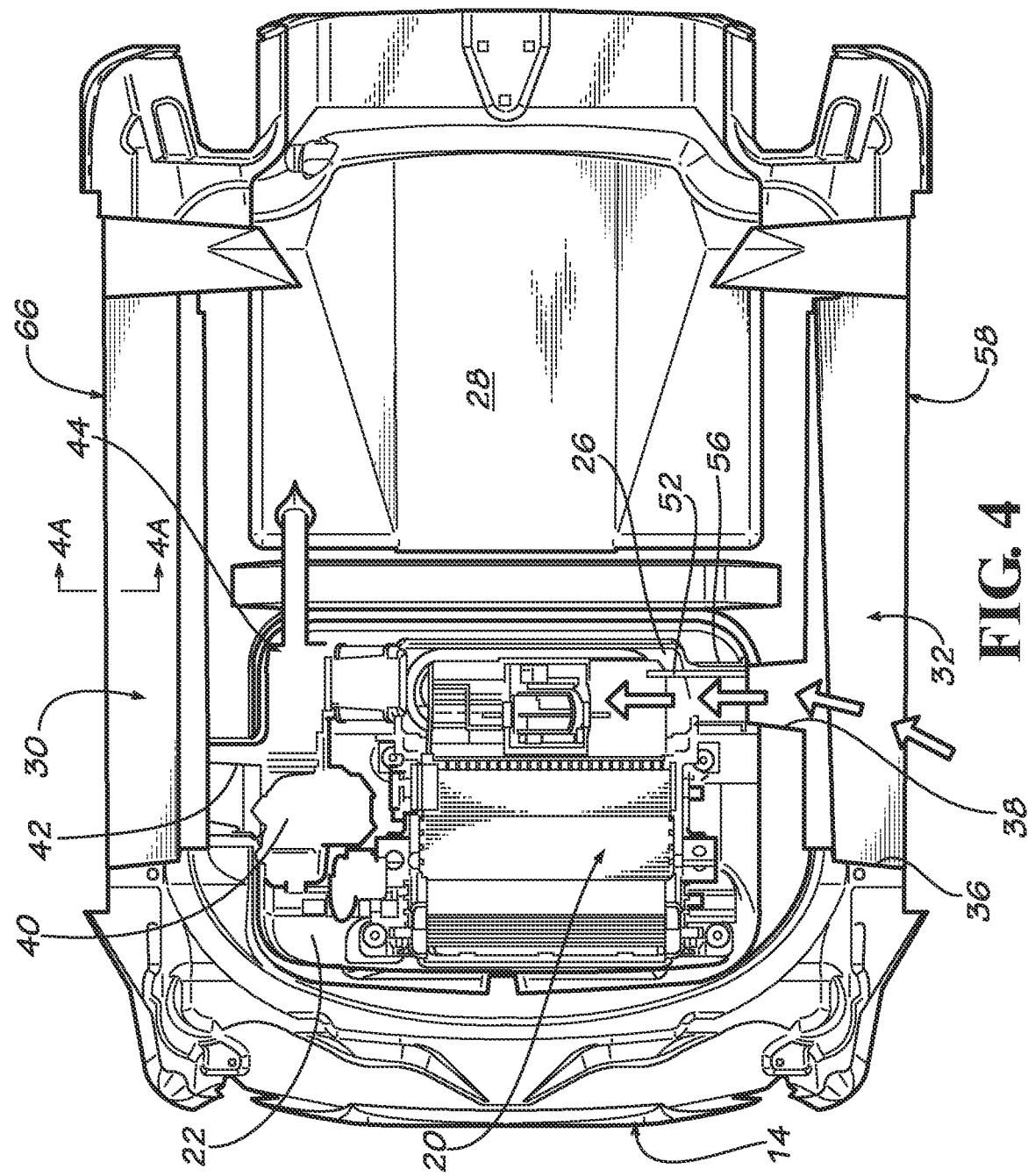

SELECTIVE FILTRATION LEVEL AIR TREATMENT SYSTEM

CROSS REFERENCE TO RELATED APPLICATIONS

This application is a US National Stage filing of International Application Serial No. PCT/EP2015/065512 entitled "SELECTIVE FILTRATION LEVEL AIR TREATMENT SYSTEM," filed Jul. 7, 2015, which claims priority to Italian Application Serial No. MO2014A000196, filed Jul. 9, 2014, each of which is incorporated by reference herein in its entirety for all purposes.

BACKGROUND OF THE INVENTION

1. Field of the Invention

The present invention relates to air treatment systems, and more specifically to air treatment systems for mobile applications.

2. Description of the Related Art

The need for effective filtration of an enclosed operator space is especially important in the agricultural field where the operator of a tractor or other vehicle is traversing an environment laden with many different types of particles, aerosols and vapors. In the past, the EU requirement for filtration of an operator space has been met with a category 2 filter (CAT 2 filter) that filters larger particles as fine as dust. Newer EU standards require a category 4 filter (CAT 4 filter) which not only filters out dust but in addition aerosols and vapors.

This requirement is especially important for operating conditions in which a field is treated with insecticide or herbicides. There are CAT 4 filters that are available for this purpose but they are expensive and have a sensitivity to harsh ambient conditions that limits their effective service life. As a result, the use of a CAT 4 filter is done on a selected basis so that it is used only when aerosols and vapors may be present in the ambient environment. The current systems for adding the CAT 4 filter are involved and introduce an added level of complexity that increases cost and the continuing maintenance requirement.

Accordingly, what is needed in the art is a simplified, yet reliable, air treatment system to provide selective filtration levels for an operator enclosure.

SUMMARY OF THE INVENTION

The invention seeks to provide simplified and reliable operator directed transition between dual levels of filtration.

The invention also seeks to utilize flow direction in such a system utilizing pressure balances.

The invention also seeks to provide an effective purge of contaminants in certain filtration operating modes.

The invention also seeks to selectively isolate filtration media from the environment when it is not actively filtering air.

In one form, the invention is an air treatment system for an enclosed operator space. The system includes an air circulating device for the operator space which has an inlet. A first filtration device having a first level of filtration is connected to the inlet of a blower which has an outlet connectable to the inlet of the air circulation device. A second filtration device having a second level of filtration is connectable to the inlet of the air circulating device. First and second valves are interposed between the first and second filtration devices, respectively and the inlet to the air circulating device. The system is characterized in that the first valve is positively actuated to open and close connection between the blower and the air circulating device and the second valve is exposed to air pressure differential created by the blower and the first valve to selectively close connection between the second filtration device and the inlet to said air circulating device.

An advantage of the air treatment device is that only a single valve actuator is needed to accomplish multiple functions in controlling air flow.

Another advantage is the reliability that is increased by the absence of additional control mechanisms.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a plan view of the operator cab FIG. 2 shown in a different operating condition;

FIG. 3A is a partial section view taken on lines 3A-3A of FIG. 3;

FIG. 4 is a plan view of the operator cab of FIGS. 2 and 3 shown in still another operating condition; and FIG. 4A is a partial section view taken on lines 4A-4A of FIG. 4.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
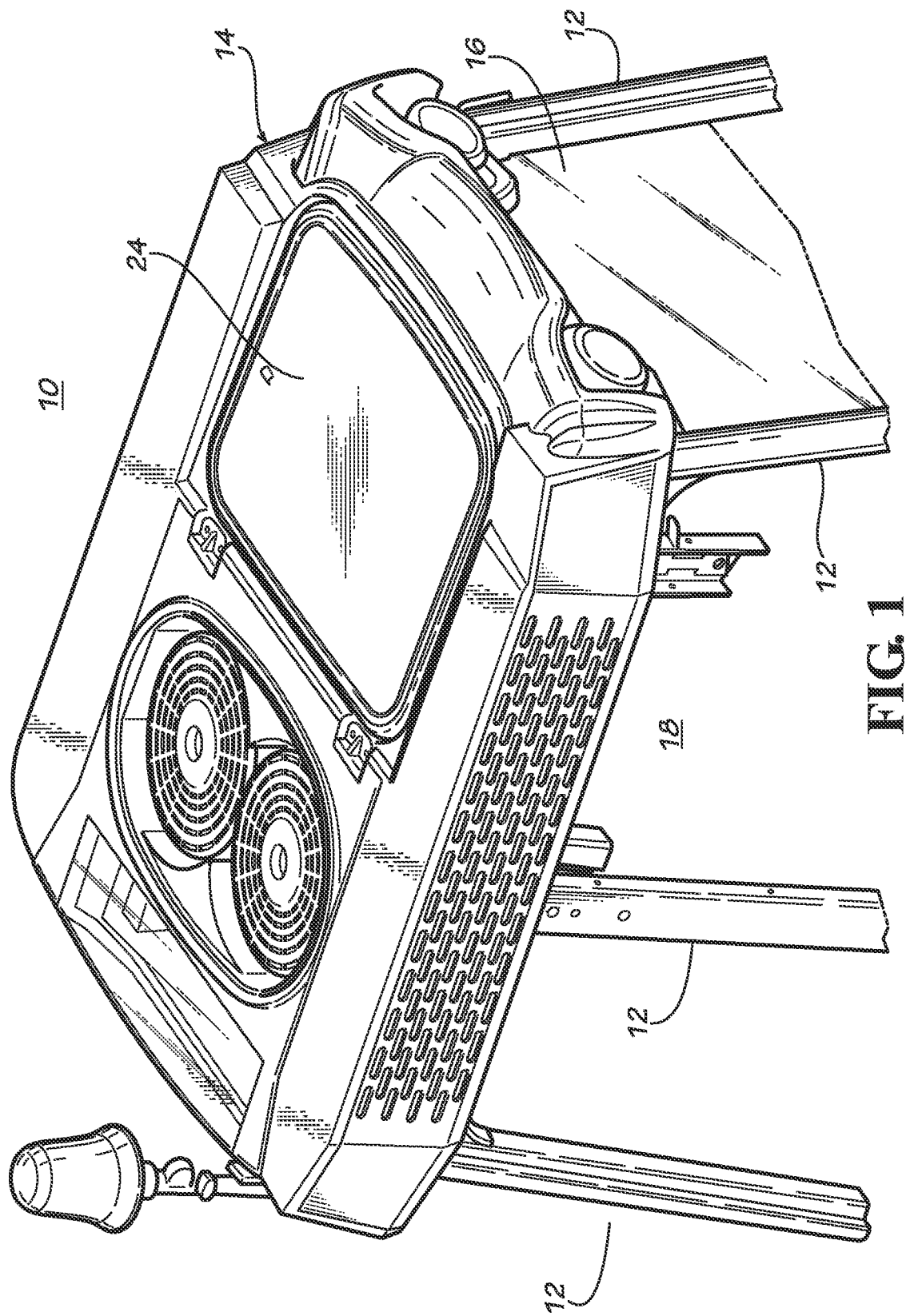
FIG. 1 is a perspective view of the cab for an agricultural tractor incorporating an air treatment system according to the present invention.

Referring now to the drawings, and more particularly to FIG. 1, there is shown an operator cab 10 providing protection for an operator of a farm implement such as a tractor. The cab 10 includes a plurality of structural posts 12 secured to the tractor frame (not shown) and providing support for a roof 14. Transparent material 16 is provided between structural posts 12 to provide an enclosed operator space 18. Only one of the transparent material panels 16 is shown to simplify the discussion of the present invention. As stated above, the operator cab 10 provides a controlled operator environment in the operator space 18. The conditioning of the air is provided within the roof 10 as described below.

Figure 2:
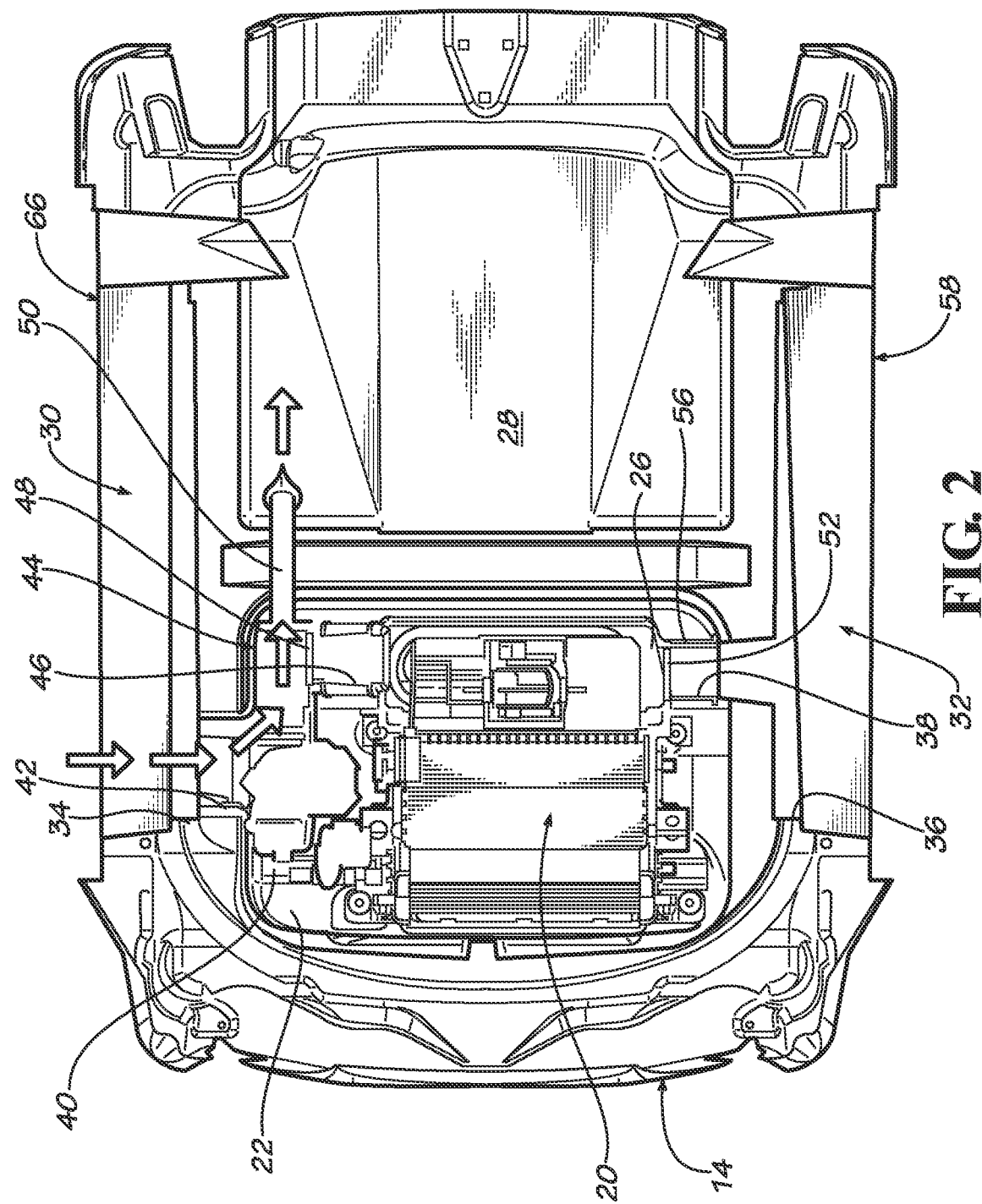
FIG. 2 is a plan view of the operator cab of FIG. 1.

Referring to FIGS. 2-4, roof 14 includes a heating ventilating and air conditioning unit 20 (HVAC) mounted within a chamber 22 formed in roof 14. HVAC unit 20 may be broadly characterized as an air circulation system. In addition, it provides heating or cooling of the air as needed within operator space 18. An access panel 24 closes off chamber 22 and is removable for maintenance and repair. The HVAC unit 20 has an inlet plenum 26 that receives air to be circulated within operator space 18 in the usual manner. This will involve a circulating fan that receives air from inlet plenum 26 and heats or cools it as needed and then discharges the conditioned air into the operator space 18. This is done to not only circulate the air but to maintain a positive pressure within operator space 18 relative to the ambient conditions to prevent ingress of contaminated air. The operating details of such a unit are well known and they are not repeated in order to more clearly focus on the present invention. The HVAC unit 20 has a condenser which is positioned within a condenser area 28 of the roof 14. Condenser area 28 is exposed to the ambient air and gives up or absorbs heat as needed to provide cooling or heating of the operator area 18.

The air that enters inlet plenum 26 of the HVAC unit 20 is selectively filtered by a category 4 filter (CAT 4 filter) 30 or a category 2 filter (CAT 2 filter) 32. The CAT 4 filter is mounted within a filter housing 34 positioned on a side edge of the roof 14 and the CAT 2 filter is mounted within a filter housing 36 on an opposite side edge of the roof 14.

A duct 42 fluidly connects filter housing 34 to a pressurization blower 40 which draws ambient air through CAT 4 filter 30 and pressurizes it for delivery through a 2-way valve 44 to a duct 46 which connects to inlet plenum 26 of the HVAC unit 20. Two way valve 44 has a valve plate 48 that is pivotal between the position shown in FIGS. 2 and 4 in which it closes off duct 46 and the position shown in FIG. 3 in which valve plate 48 closes off a duct 50 leading from 2-way valve 44 to the condenser area 28.

A duct 38 connects the CAT 2 filter housing 36 to inlet plenum 26. A valve plate 52 is pivotal between the position shown in FIGS. 2 and 3 in which it closes off intake plenum 26 from CAT 2 filter housing 36 and the position of FIG. 4 in which it permits flow. Unlike two way valve 44, valve plate 52 is operated by exposure to pressure balances as will be described below. The valve plate 52 is biased to the position of FIGS. 2 and 3, for example by a spring (not shown). An orifice 56 of a predetermined size in duct 38 provides a calibrated flow of air from chamber 22 into duct 38 and then to CAT 2 filter housing 36.

In order to isolate the CAT 4 and CAT 2 filters 30 and 32 from the ambient environment as needed, a series of valves are placed on an exterior wall. Specifically, the CAT 2 filter housing 36 has an outer inlet panel 58. As shown in FIG. 3A, outer inlet panel 58 has a valve a plurality of valves 60 that rest against an orifice 62 formed in a wall of outer panel 58 that is angled so that gravity holds the valves 60 in place. Valves 60 are fastened to outer inlet panel 58 by appropriate fasteners 64. Valves 60 may be formed from appropriate flexible or semi-rigid material so long as they selectively permit flow only from left to right as shown in FIG. 3A.

As shown in FIG. 4A, the CAT 4 filter has a corresponding arrangement to isolate the CAT 4 filter 30 from the ambient environment when needed. An outer inlet panel 66 is positioned over CAT 4 filter housing 34. As with the valves for the CAT 2 filter the valves 68 are positioned in an angled portion of panel 66 so that they are biased by gravity to a position for blocking flow through orifices 70. When it is desired to induce flow through the CAT 4 filter 30, flow will be from left to right as shown in FIG. 4A. The valves 68 are connected to outer inlet panel 66 by appropriate fasteners 72.

In operation, the two way valve 44 is positioned in conjunction with operation of the pressurization blower 40 to provide selective filtration through either the CAT 4 filter 30 or the CAT 2 filter 32. In accordance with the present invention, the apparatus described enables a simplified and reliable selection of the appropriate filter while at the same time isolating the filter not in use from the contaminants in the ambient air outside the operator cab 10. The pressurization blower 40 and two way valve 44 may be conveniently operated by a microprocessor (not shown) that receives appropriate operator and operating parameter inputs to provide the proper coordination. The use of a microprocessor is well enough known so that details are not repeated to enable a better focus on the invention.

Referring to FIG. 2, the retained aerosols and vapors that may have migrated through the CAT 4 filter 30 must be purged before the air flowing from the CAT 4 filter 30 is directed to the operator space 18 by the HVAC unit 20. In this position, valve plate 48 is positively manipulated to close off duct 46 and prevent any air flow to the inlet plenum 26 of HVAC unit 20. The pressurization blower 40 is engaged to pressurize air and deliver it through duct 52 to the condenser area 28 which is exposed to the ambient air. The flow of air through CAT 4 filter for a given period of time, such as one minute, ensures that all vapors and aerosols are purged from the CAT 4 filter 30 before active use.

When the purging of the CAT 4 filter 30 is completed, the system is placed in the condition shown in FIG. 3 in which the valve plate 48 opens flow through duct 46 and closes off flow through duct 50. In this condition, air is drawn in through CAT 4 filter 30 and pressurized for delivery to inlet plenum 26. The HVAC blower takes the air and circulates it through the operating space. Because there is an overpressure in inlet plenum 26 caused by the pressurization blower 40, air passes through through chamber 22 to orifice 56 positioned between valve plate 52 and duct 38 leading to the CAT 2 chamber 36. The size of orifice 56 is calculated so that the pressure within duct 38 and housing 36 is above atmosphere but not so great that it forces open valve plate 52. As a result of the positive pressurization within the CAT 2 filter housing 36, the valve plates 60 are positively held against orifices 62, thus effectively isolating the CAT 2 filter when the operator cab 10 is in an ambient environment containing vapors and aerosols, such as occur with insecticides and herbicides. As a result, when the tractor on which the operator cab 10 is mounted traverses a bumpy field, the valves 60 are held in place and do not vibrate open. This ensures that the CAT 2 filter, when subsequently operated, does not retain residual aerosols and vapors that could be discharged into the operator space 18 by the HVAC unit 20.

When it is no longer necessary to utilize the CAT 4 filter 30, the system is placed in the condition shown in FIG. 4 in which the valve plate 48 blocks flow through duct 46 and the blower 40 is not operated. In this condition, operation of the blower circulating air through the operator space via the HVAC unit 20 creates a suction in the inlet plenum 26 which pulls open valve plate 52 and permits flow of air from the CAT 2 filter to the inlet plenum 26 of the HVAC unit 20. The valves 60, shown in FIG. 3A, permit free flow of air through orifices 60 and through the CAT 2 filter 32 to the inlet plenum 26. If desired, an additional valve may be provided to close off duct 50 during operation of CAT 2 filter to prevent aging of the CAT 4 filter.

The system described above provides a simplified control scheme for an otherwise complicated valve logic enabling selective use and isolation of two different filtration levels. By utilizing the pressure variations within the system, the appropriate direction or isolation of air flow is simply and effectively achieved.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An air treatment system for an enclosed operator space, said system comprising:
    an air circulating device having an air inlet and circulating air to said operator space;
    a first filtration device having a first level of filtration;
    a blower having an inlet connected to said first filtration device and an outlet connectable to the inlet of said air circulating device;
    a second filtration device having a second level of filtration and connectable to the inlet of said air circulating device;
    first and second valves interposed between said first and second filtration devices, respectively and the inlet to said air circulating device for selective connection;
    wherein the first valve is positively actuated to open and close and the second valve is exposed to air pressure differentials created by said blower and said first valve to selectively connect or block flow between the second filtration device and the inlet to said air circulating device.

2. The air treatment system as claimed in claim 1, wherein the air circulating device has an inlet plenum to which the first and second valves are connected.

3. The air treatment system as claimed in claim 2, wherein said second valve is mounted for pivotal movement between a position in which it blocks flow of air from said second filtration device to the inlet of said air circulating device and a second position in which it permits flow between the second filtration device and the inlet to said air circulation device, said valve being urged to the closed position and opened when said circulating device is operated to permit flow from said second filtration device to the inlet of said air circulation device.

4. The air treatment system as claimed in claim 1 further comprising valves at the inlet to said first and second filtration devices for permitting only air flow into said filtration devices.

5. The air treatment system as claimed in claim 4, wherein said valves are biased to a closed position.

6. The air treatment system as claimed in claim 5, wherein said valves are biased to a closed position by gravity.

7. The air treatment system as claimed in claim 1 in which the first filtration device is a device meeting EU category 4 (CAT 4) filtration requirements and the second filtration device is a filtration device meeting the requirements of EU category 2 (CAT 2) filtration.

8. The air treatment system as claimed in claim 1 wherein the air circulating device is a heating ventilating and air conditioning (HVAC) device.

9. An enclosed operator space with treated air, said enclosed operator space comprising:
    a cab having a roof and forming an enclosed operator space;
    an air treatment system for said enclosed operator space, said system comprising:
        an air circulating device having an air inlet and circulating air to said operator space;
        a first filtration device having a first level of filtration;
        a blower having an inlet connected to said first filtration device and an outlet connectable to the inlet of said air circulating device;
        a second filtration device having a second level of filtration and connectable to the inlet of said air circulating device;
        first and second valves interposed between said first and second filtration devices, respectively and the inlet to said air circulating device for selective connection;
        wherein the first valve is positively actuated to open and close and the second valve is exposed to air pressure differentials created by said blower and said first valve to selectively connect or block flow between the second filtration device and the inlet to said air circulating device.

10. The enclosed operator space as claimed in claim 9, wherein the air circulating device has an inlet plenum to which the first and second valves are connected.

11. The enclosed operator space as claimed in claim 10, wherein said second valve is mounted for pivotal movement between a position in which it blocks flow of air from said second filtration device to the inlet of said air circulating device and a second position in which it permits flow between the second filtration device and the inlet to said air circulation device, said valve being urged to the closed position and opened when said circulating device is operated to permit flow from said second filtration device to the inlet of said air circulation device.

12. The enclosed operator space as claimed in claim 9, further comprising valves at the inlet to said first and second filtration devices for permitting only air flow into said filtration devices.

13. The enclosed operator space as claimed in claim 12, wherein said valves are biased to a closed position.

14. The enclosed operator space as claimed in claim 13, wherein said valves are biased to a closed position by gravity.

15. The enclosed operator space as claimed in claim 9, wherein the first filtration device is a device meeting EU category 4 (CAT 4) filtration requirements and the second filtration device is a filtration device meeting the requirements of EU category 2 (CAT 2) filtration.

16. The enclosed operator space as claimed in claim 9, wherein the air circulating device is a heating ventilating and air conditioning (HVAC) device.

* * * * *